(12) United States Patent
Åkesson et al.

(10) Patent No.: US 10,893,393 B2
(45) Date of Patent: Jan. 12, 2021

(54) MBMS BEARER SETUP IN A GROUP COMMUNICATIONS SYSTEM

(71) Applicant: TELEFONAKTIEBOLAGET LM ERICSSON (PUBL), Stockholm (SE)

(72) Inventors: Joakim Åkesson, Landvetter (SE); Magnus Tränk, Lerum (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 515 days.

(21) Appl. No.: 15/082,449

(22) Filed: Mar. 28, 2016

(65) Prior Publication Data

US 2017/0086033 A1 Mar. 23, 2017

Related U.S. Application Data

(60) Provisional application No. 62/221,880, filed on Sep. 22, 2015.

(51) Int. Cl.
*H04W 4/08* (2009.01)
*H04W 4/10* (2009.01)
(Continued)

(52) U.S. Cl.
CPC .......... *H04W 4/08* (2013.01); *H04L 65/1069* (2013.01); *H04L 65/4061* (2013.01);
(Continued)

(58) Field of Classification Search
CPC ..... H04L 12/16; H04L 12/185; H04L 12/189; H04L 12/1877; H04L 65/80;
(Continued)

(56) References Cited

U.S. PATENT DOCUMENTS

2004/0157640 A1\* 8/2004 Pirskanen et al.
2006/0126635 A1  6/2006 Alberth, Jr. et al.
(Continued)

FOREIGN PATENT DOCUMENTS

JP  2010-529761 A   8/2010
WO  2014193959 A1  12/2014

OTHER PUBLICATIONS

3rd Generation Partnership Project; Technical Specification Group Services and System Aspects; Functional architecture and information flows to support mission critical communication services; Stage 2 (Release 13). 3GPP TS 23.179 V0.2.0 (Jul. 2015).
(Continued)

*Primary Examiner* — Marsha D Banks Harold
*Assistant Examiner* — Dharmesh J Patel (57) ABSTRACT

In accordance with particular embodiments, a method, performed by a control node, for multimedia broadcast multicast service, MBMS, bearer setup in a group communications system comprises activating and announcing an MBMS bearer to the client nodes. The MBMS bearer is independent of any particular group of client nodes. The method also includes obtaining a call setup message for a group call from a first client node of the client nodes. The method additionally includes broadcasting a connect message for the group call to at least one other client node of the client nodes in response to having received the call setup message. In accordance with certain embodiments, a method, performed by a client node, for MBMS bearer setup in a group communications system comprises obtaining a service announcement of an MBMS bearer from a control node. The MBMS bearer is independent of any particular group of client nodes. The method additionally includes providing a call setup message for a group call to the control node in response thereto.

19 Claims, 5 Drawing Sheets

(51) Int. Cl.
*H04L 29/06* (2006.01)
*H04W 76/10* (2018.01)
*H04W 76/40* (2018.01)

(52) U.S. Cl.
CPC .......... *H04L 65/4076* (2013.01); *H04W 4/10* (2013.01); *H04W 76/10* (2018.02); *H04W 76/40* (2018.02)

(58) Field of Classification Search
CPC .............. H04L 65/103; H04L 65/1046; H04L 65/1069; H04L 65/4076; H04M 3/56; H04W 4/003; H04W 4/06; H04W 4/08; H04W 4/10; H04W 4/12; H04W 8/18; H04W 8/186; H04W 60/00; H04W 72/005; H04W 72/121; H04W 76/002; H04W 84/08
See application file for complete search history.

(56) References Cited

U.S. PATENT DOCUMENTS

| | | | |
|---|---|---|---|
| 2007/0259675 A1* | 11/2007 | Worrall | |
| 2012/0170501 A1* | 7/2012 | Drozt | H04W 72/005 370/312 |
| 2012/0170502 A1* | 7/2012 | Korus | H04W 4/06 370/312 |
| 2013/0194999 A1* | 5/2013 | Anchan et al. | |
| 2014/0064177 A1* | 3/2014 | Anchan | |
| 2014/0286222 A1 | 9/2014 | Yu et al. | |
| 2015/0131510 A1 | 5/2015 | Gilbert et al. | |

OTHER PUBLICATIONS

3rd Generation Partnership Project; Technical Specification Group Services and System Aspects; Functional architecture and information flows to support mission critical communication services; Stage 2 (Release 13). 3GPP TS 23.179 v0.4.0 (Aug. 2015).

NSN, Generic Pre-established MBMS bearer for GCSE, SA WG2 Meeting #101, S2-140245, Taipei, Taiwan, Jan. 20-24, 2014.

* cited by examiner

MBMS BEARER SETUP IN A GROUP COMMUNICATIONS SYSTEM

TECHNICAL FIELD

Embodiments presented herein relate to a control node, a client node, computer programs, and a computer program product for multimedia broadcast multicast service (MBMS) bearer setup in a group communications system.

BACKGROUND

In communications systems, there may be a challenge to obtain good performance and capacity for a given communications protocol, its parameters and the physical environment in which the communications system is deployed.

For example, one example of applications available in some communications system is group communications services. In general terms, group communication requires that the same information is delivered to multiple clients. In group communication systems (e.g. Push-To-Talk (PTT) systems) the clients receiving the same media constitute a group of clients. These clients may be located at different locations. If many clients are located within the same area, multicast or broadcast based transmission using e.g. Multicast-Broadcast Multimedia Services (MBMS) is efficient.

When MBMS is used in group communication systems the clients needs to be informed prior a group call of what radio resources will be used for the broadcasted media and how the clients are to receive the specific group call in those resources. The process to notify the clients with the information to receive a group call over MBMS is denoted service announcement process.

In group communication systems (e.g. Push-To-Talk (PTT) systems) a floor control function is essential. The floor control function gives the clients the ability to request certain capacity of shared resources used to transmit media to other clients in the group communication system. In order to efficiently use a floor control function there is a need for a floor arbitrator, which at every moment decides which client is allowed to transmit media. The floor control process starts with a client that wish to transmit media sends a floor request message to the floor arbitrator. If there are available resources the floor arbitrator grants the client the right to transmit by the floor arbitrator sending a floor grant message to that client. The floor arbitrator also sends a floor taken message to all clients that have announced interest in participating, and thus exchanging media, in the specific communication group.

Figure 10:
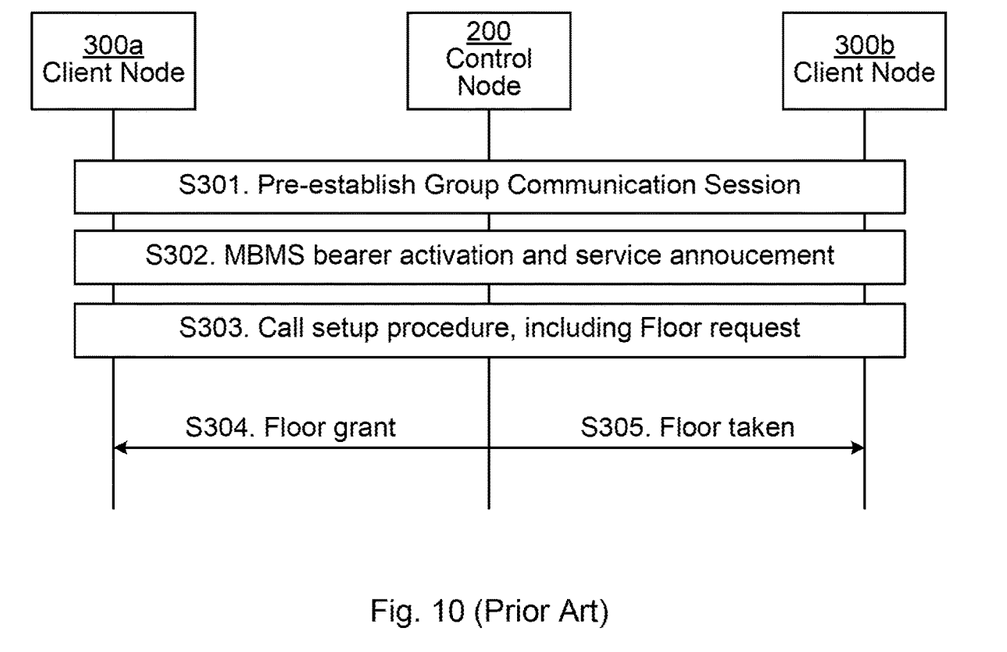
FIG. 10 is a signalling diagram according to prior art.

FIG. 10 is a signalling diagram for utilizing MBMS bearers for group communications over a cellular communications system according to prior art.

At least one group communications session is pre-established and by that handshake media description parameters for the type of communication that shall be performed (step S301).

If MBMS bearers are used for group communications it is required that the MBMS bearers are activated and that the MBMS bearers are announced to the clients (step S302). The announcement includes description of the media, including the Internet protocol (IP) address and ports that the media will be sent to, media codecs and encryption keys. Furthermore, the announcement is group specific.

A call setup procedure is triggered by the first floor request (step S303). The service announcement process (as in step S302 above) must be performed before the call setup, since this process takes too long time. Furthermore, the floor control messages are sent on the same bearer as the media. This means that both media packets and control packages are being sent on the same MBMS bearer.

The floor request message is responded to with a floor grant message, thereby granting the client having sent the floor request to use the announced MBMS bearer for media transmission for the specific group (step S304).

A floor taken message is broadcasted to the other clients to inform these clients that the MBMS bearer will be used for media transmission (step S305).

Under normal network conditions not all groups have ongoing calls at the same time. It may therefore be inefficient to activate group specific MBMS bearers and to announce the resources for all groups that use MBMS bearers for group communications, since many groups might be silent (i.e., groups where no media is currently being transmitted between the clients).

Hence, there is still a need for an improved utilization of available network resources for efficient group communications.

SUMMARY

An object of embodiments herein is to efficient utilization of available network resources for efficient group communications.

According to a first aspect there is presented a method for multimedia broadcast multicast service (MBMS) bearer setup in a group communications system. The method is performed by a control node. The method comprises activating and announcing an MBMS bearer to the client nodes, wherein the MBMS bearer is independent of any particular group of client nodes. The method comprises obtaining a call setup message for a group call from a first client node of the client nodes. The method comprises broadcasting a connect message for the group call to at least one other client node of the client nodes in response to having received the call setup message.

Advantageously this provides an efficient setup procedure for MBMS bearer in a group communications system.

Advantageously this provides an efficient service announcement process. This enables radio resources to be utilized in an efficient and dynamic way.

Advantageously this enables the control node to determine which group call shall be broadcasted based on the number of clients in each group.

According to a second aspect there is presented a control node for multimedia broadcast multicast service (MBMS) bearer setup in a group communications system. The control node comprises processing circuitry. The processing circuitry is configured to cause the control node to perform a set of operations. The processing circuitry is configured to cause the control node to activate and announce an MBMS bearer to the client nodes, wherein the MBMS bearer is independent of any particular group of client nodes. The processing circuitry is configured to cause the control node to obtain a call setup message for a group call from a first client node of the client nodes. The processing circuitry is configured to cause the control node to broadcast a connect message for the group call to at least one other client node of the client nodes in response to having received the call setup message.

According to a third aspect there is presented a computer program for multimedia broadcast multicast service (MBMS) bearer setup in a group communications system, the computer program comprising computer program code which, when run on processing circuitry of a control node, causes the control node to perform a method according to the first aspect.

According to a fourth aspect there is presented a method for multimedia broadcast multicast service (MBMS) bearer setup in a group communications system. The method is performed by a client node. The method comprises obtaining a broadcast service announcement of an MBMS bearer from a control node, the MBMS bearer being independent of any particular group of client nodes. The method comprises providing a call setup message for a group call to the control node.

According to a fifth aspect there is presented client node for multimedia broadcast multicast service (MBMS) bearer setup in a group communications system. The client node comprises processing circuitry. The processing circuitry is configured to cause the client node to perform a set of operations. The processing circuitry is configured to cause the client node to obtain a broadcast service announcement of an MBMS bearer from a control node, the MBMS bearer being independent of any particular group of client nodes. The processing circuitry is configured to cause the client node to provide a call setup message for a group call to the control node.

According to a sixth aspect there is presented a computer program for multimedia broadcast multicast service (MBMS) bearer setup in a group communications system, the computer program comprising computer program code which, when run on processing circuitry of a client node, causes the client node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached list of embodiments as well as from the drawings.

Generally, all terms used in the disclosure are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The proposed solutions are now described, by way of example, with reference to the accompanying drawings, in which.

DETAILED DESCRIPTION

The proposed solutions will now be described more fully hereinafter with reference to the accompanying drawings, in which certain embodiments are shown. These proposed solutions may, however, be embodied in many different forms and should not be construed as limited to the embodiments set forth herein; rather, these embodiments are provided by way of example so that this disclosure will be thorough and complete, and will fully convey the scope of the proposed solutions to those skilled in the art. Like numbers refer to like elements throughout the description. Any step or feature illustrated by dashed lines should be regarded as optional.

Figure 1:
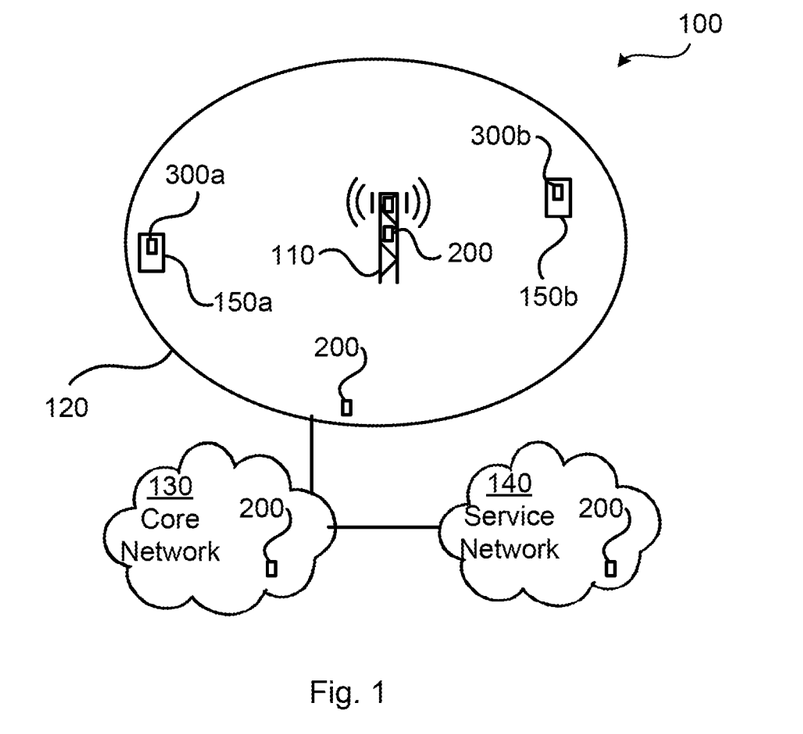
FIG. 1 is a schematic diagram illustrating a communications system according to embodiments.

FIG. 1 is a schematic diagram illustrating a communications system 100 where embodiments presented herein can be applied. The communications system 100 is assumed to provide services for group communication may hence be regarded as a group communications system. The group communications system 100 may be a push to talk (PTT) system.

The communications system 100 comprises at least one control node 200 and at least two client nodes 300a, 300b. The at least one control node 200 may be provided in, or installed on, a radio access network node 110 or in another entity or device in a radio access network 120, in an entity or device of a core network 130, or in an entity or device of a service network 140. Each client node may be provided in, or installed on, a respective wireless device 150a, 150b.

Examples of wireless devices 150a, 150b include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, and access points. As the skilled person understands, the communications system 100 may comprise a plurality of radio access network nodes 110, each providing network access to a plurality of wireless devices 150a, 150b. The herein disclosed embodiments are no limited to any particular number of radio access network nodes 110 or wireless devices 150a, 150b. In this respect it is assumed that there is at least one control node 200 and at least two client nodes 300a, 300b.

The embodiments disclosed herein thus relate to mechanisms for multimedia broadcast multicast service (MBMS) bearer setup in a group communications system. In order to obtain such mechanisms there is provided a control node 200, a method performed by the control node 200, a computer program comprising code, for example in the form of a computer program product, that when run on processing circuitry of the control node 200, causes the control node 200 to perform the method. In order to obtain such mechanisms there is further provided a client node 300a, 300b, a method performed by the client node 300a, 300b, and a computer program comprising code, for example in the form of a computer program product, that when run on processing circuitry of the client node 300a, 300b, causes the client node 300a, 300b to perform the method.

Figure 2A:
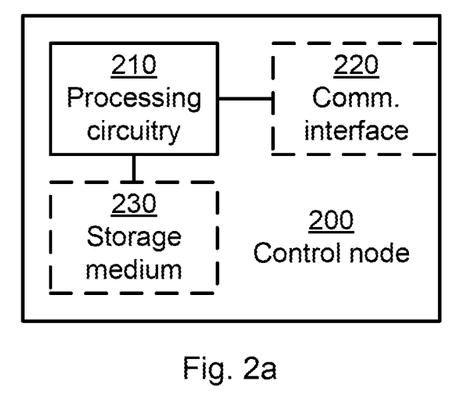
FIG. 2a is a schematic diagram showing functional units of a control node according to an embodiment.

FIG. 2a schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410a (as in FIG. 4), e.g. in the form of a storage medium 230.

Particularly, the processing circuitry 210 is configured to cause the control node 200 to perform a set of operations, or steps, S101-S105. These operations, or steps, S101-S105 will be disclosed below. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The control node 200 may further comprise a communications interface 220 for communications at least with client nodes 300a, 300b. As such the communications interface 220 may comprise one or more transmitters and receivers, comprising analogue and digital components and a suitable number of antennas for wireless communications and ports for wireline communications.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 2B:
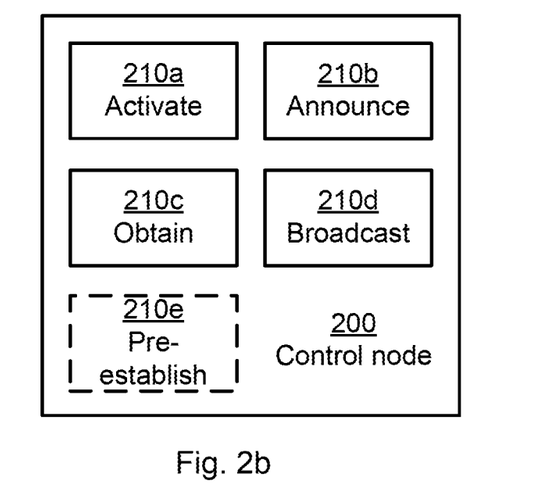
FIG. 2b is a schematic diagram showing functional modules of a control node according to an embodiment.

FIG. 2b schematically illustrates, in terms of a number of functional modules, the components of a control node 200 according to an embodiment. The control node 200 of FIG. 2b comprises a number of functional modules; an activate module 210a configured to perform below step S102, an announce module 210b configured to perform below step S102, an obtain module 210c configured to perform below steps S103, S105, and a broadcast module 210d configured to perform below step S104. The control node 200 of FIG. 2b may further comprise a number of optional functional modules, such as any of a pre-establish module 210e configured to perform below step S101. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

The control node 200 may be provided as a standalone device or as a part of at least one further device. For example, the control node 200 may be provided in a node of the radio access network or in a node of the core network. Alternatively, functionality of the control node 200 may be distributed between at least two devices, or nodes. These at least two nodes, or devices, may either be part of the same network part (such as the radio access network or the core network) or may be spread between at least two such network parts. Some examples of where in the communications system 100 the control node 200 may be provided are illustrated in FIG. 1.

Functionality of the control node 200 may be implemented at the service layer of the protocol stack. In general terms, instructions that are required to be performed in real time may be performed in a device, or node, operatively closer to the radio access network than instructions that are not required to be performed in real time. In this respect, at least part of the control node 200 may reside in the radio access network, such as in the radio access network node, for cases when embodiments as disclosed herein are performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210e of FIG. 2b and the computer program 420a of FIG. 4 (see below).

Figure 3A:
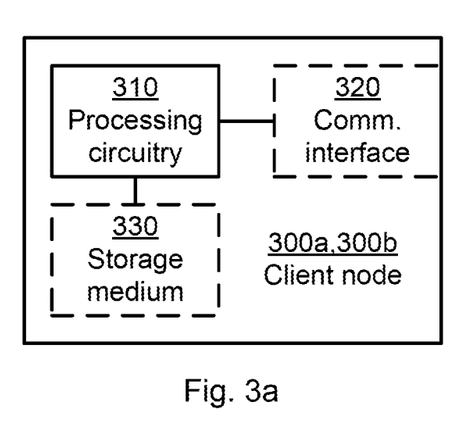
FIG. 3a is a schematic diagram showing functional units of a client node according to an embodiment.

FIG. 3a schematically illustrates, in terms of a number of functional units, the components of a client node 300a, 300b according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the client node 300a, 300b to perform a set of operations, or steps, S201-S205. These operations, or steps, S201-S205 will be disclosed below. For example, the storage medium 330 may store the set of operations, and the processing circuitry 310 may be configured to retrieve the set of operations from the storage medium 330 to cause the client node 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The client node 300a, 300b may further comprise a communications interface 320 for communications at least with the control node 200. As such the communications interface 320 may comprise one or more transmitters and receivers, comprising analogue and digital components and a suitable number of antennas for wireless communications and ports for wireline communications.

The processing circuitry 310 controls the general operation of the client node 300a, 300b e.g. by sending data and control signals to the communications interface 320 and the storage medium 330, by receiving data and reports from the communications interface 320, and by retrieving data and instructions from the storage medium 330. Other components, as well as the related functionality, of the client node 300a, 300b are omitted in order not to obscure the concepts presented herein.

Figure 3B:
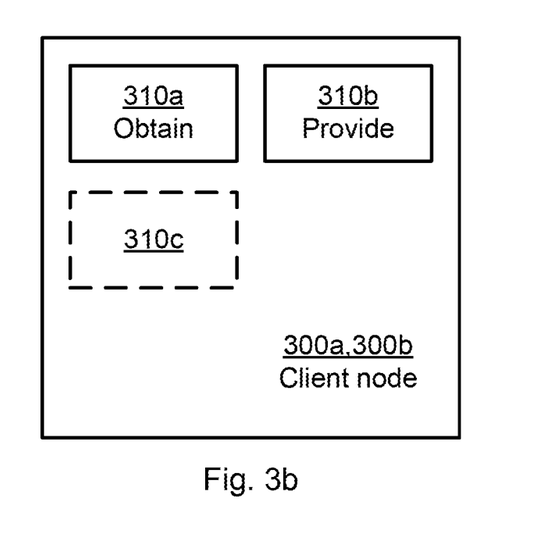
FIG. 3b is a schematic diagram showing functional modules of a client node according to an embodiment.

FIG. 3b schematically illustrates, in terms of a number of functional modules, the components of a client node 300a, 300b according to an embodiment. The client node 300a, 300b of FIG. 3b comprises a number of functional modules; an obtain module configured to perform below steps S201, S202, and a provide module configured to perform below steps S203, S205. The client node 300a, 300b of FIG. 3b may further comprises a number of optional functional modules, as herein represented by functional module 310c. The functionality of each functional module 310a-310b will be further disclosed below in the context of which the functional modules 310a-310b may be used. In general terms, each functional module 310a-310b may be implemented in hardware or in software. Preferably, one or more or all functional modules 310a-310b may be implemented by the processing circuitry 310, possibly in cooperation with functional units 320 and/or 330. The processing circuitry 310 may thus be arranged to from the storage medium 330 fetch instructions as provided by a functional module 310a-310b and to execute these instructions, thereby performing any steps as will be disclosed hereinafter.

The client node 300a, 300b may be provided as a stand-alone device or as a part of at least one further device. For example, the client node 300a, 300b may be provided in a wireless device 150a, 150b. Hence, any processing circuitry, communications interface and storage medium of the wireless device 150a, 150b may be shared with the processing circuitry 310, communications interface 320 and storage medium 330 of the client node 300a, 300b. It is thus not necessary for the client node 300a, 300b to have its own processing circuitry 310, communications interface 320 and storage medium 330 as long as the processing circuitry, communications interface and storage medium of the wireless device 150a, 150b is configured to implement the functionality of the herein disclosed client node 300a, 300b.

Figure 4:
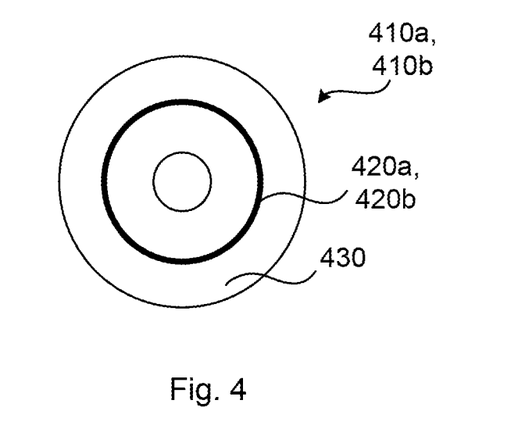
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the control node 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the client node 300a, 300b as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 5:
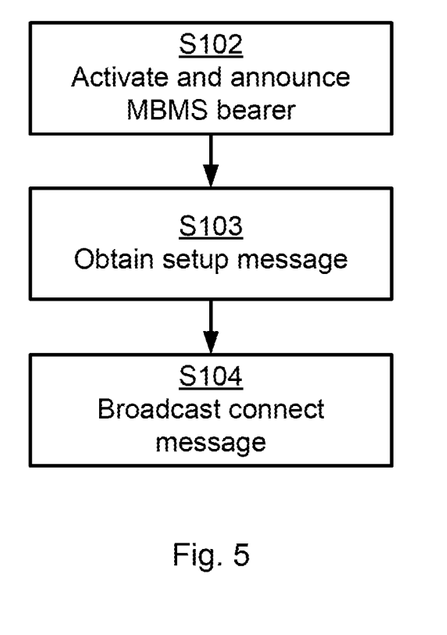
FIGS. 5, 6, 7, and 8 are flowcharts of methods according to embodiments.
Figure 6:
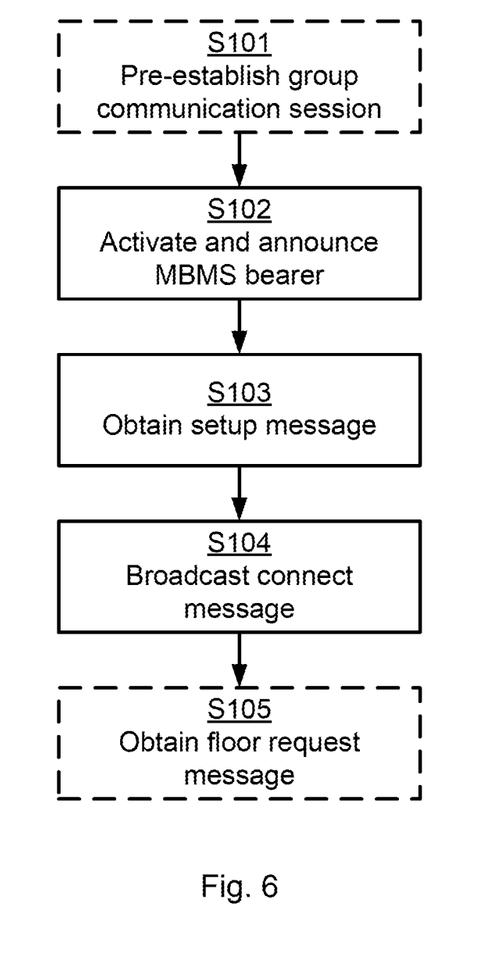
Figure 7:
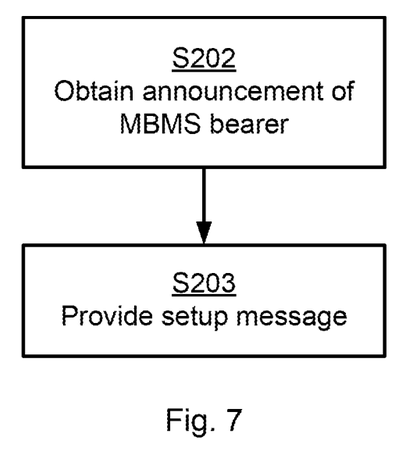
Figure 8:
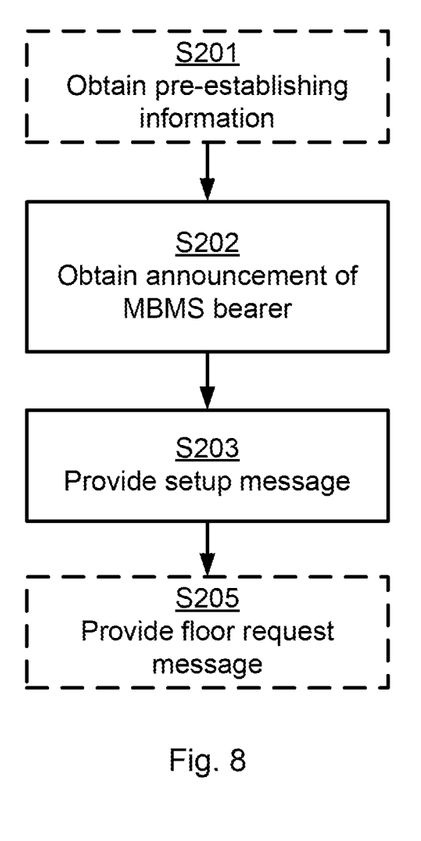

FIGS. 5 and 6 are flow charts illustrating embodiments of methods for MBMS bearer setup as performed by the control node 200. FIGS. 7 and 8 are flow charts illustrating embodiments of methods for MBMS bearer setup as performed by the client node 300a. The methods are advantageously provided as computer programs 420a, 420b.

Reference is now made to FIG. 5 illustrating a method for MBMS bearer setup as performed by the control node 200 according to an embodiment.

An MBMS bearer is activated and announced for group communications traffic, without indicating any group assigned to the MBMS bearer. Hence, the control node 200 is configured to, in a step S102, activate and announce an MBMS bearer to the client nodes 300a, 300b, wherein the MBMS bearer is independent of any particular group of client nodes 300a, 300b. The MBMS bearer is thus announced without indicating any particular group of client nodes 300a, 300b assigned to the MBMS bearer. In this respect the activate module 210a and the announce module 210b may comprise instructions that when executed by the control node 200 causes the processing circuitry 210, possibly in conjunction with the communications interface 220 and the storage medium 230, to activate and announce the MBMS bearer in order for the control node 200 to perform step S101.

The floor request message will be preceded by a call setup message indicating which resources of the MBMS bearer that will be used for the specific group call. Hence, the control node 200 is configured to, in a step S103, obtain a call setup message for a group call from a first client node 300a of the client nodes 300a, 300b. In this respect the obtain module 210c may comprise instructions that when executed by the control node 200 causes the processing circuitry 210, possibly in conjunction with the communications interface 220 and the storage medium 230, to obtain the call setup message in order for the control node 200 to perform step S103.

Further, the control node 200 is configured to, in a step S104, broadcast a connect message for the group call to at least one other client node 300b of the client nodes 300a, 300b in response to having received the call setup message in step S103. In this respect the broadcast module 210d may comprise instructions that when executed by the control node 200 causes the processing circuitry 210, possibly in conjunction with the communications interface 220 and the storage medium 230, to broadcast the connect message in order for the control node 200 to perform step S104.

The group communication sessions and service announcement are group agnostic. When the group call setup is performed, all downlink (from control node to client node) communications may be done over MBMS bearers.

Embodiments relating to further details of MBMS bearer setup as performed by the control node 200 will now be disclosed.

The announcement of the MBMS bearer may comprise parameters of media streams to be transmitted on the MBMS bearer.

The call setup message may comprise a group identifier of a specific group of client nodes 300a, 300b for the group call. The control node 200 has access to group identifiers for the client nodes 300a, 300b and hence knows the participants of each group. The control node 200 may determine whether unicast or broadcast is to be used. If broadcast determined the control node 200 determines which stream within a bearer to use.

For example, the control node 200 may thereby determine which group call shall be broadcasted based on the number of client nodes 300a, 300b in each group. For example, assume that a first group call with N1 participating client nodes is ongoing over an MBMS bearer, and a second group call is started in a second group call with N2>N1 participating client nodes. The control node 200 may be configured to let the larger group (i.e., the second group in the present example) use the resources of the MBMS bearer and hence move the first group to unicast transmission.

Reference is now made to FIG. 6 illustrating methods for MBMS bearer setup as performed by the control node 200 according to further embodiments.

According to an embodiment the control node 200 is configured to, in a step S101, pre-establishing at least the group communication session. The pre-establishing may occur prior to the control node 200 activating and broadcasting the MBMS bearer. Hence, the group communication sessions and service announcement may be performed prior any group call setup. However, this is not a requirement; alternatively, step S102 is performed prior to step S101. The activation of the MBMS bearer and the pre-establishment of the group communication session could be done in any order, as long as both are performed before the call setup message is obtained, as in step S103. The pre-establishing in step S101 may comprise exchanging media description parameters and communications parameters with the client nodes 300a, 300b.

The connect message as broadcasted in step S104 may inform which resources on the bearer that will be used for the media for a specific group of client nodes. The control node 200 may thereby assign resources from a pool of resources (in the form of available MBMS bearers) to a group call and notify the client nodes of the assigned resources.

The control node 200 may be configured to handle floor control in the group communications system 100. According to an embodiment the control node 200 is configured to, in a step S105, obtain a floor request message for the group call from the first client node 300a after having obtained the call setup message. The floor request message may be obtained after having obtained the call setup message for the group call in step S103. Alternatively, the floor request message and the call setup message (as obtained in step s103) are combined into one message.

Reference is now made to FIG. 7 illustrating a method for MBMS bearer setup as performed by the client node 300a according to an embodiment.

As noted above, the control node 200 in step S102 announces an MBMS bearer. The client node 300a may therefore configured to, in a step S202, obtain a broadcast service announcement of an MBMS bearer from the control node 200. The MBMS bearer is independent of any particular group of client nodes 300a, 300b. In this respect the obtain module 310a may comprise instructions that when executed by the client node 300a causes the processing circuitry 310, possibly in conjunction with the communications interface 320 and the storage medium 330, to obtain the broadcast service announcement in order for the client node 300a to perform step S202.

The client node 300a may then be configured to, in a step S203, provide a call setup message for a group call to the control node 200. In this respect the provide module 310b may comprise instructions that when executed by the client node 300a causes the processing circuitry 310, possibly in conjunction with the communications interface 320 and the storage medium 330, to provide the call setup message in order for the client node 300a to perform step S203.

The call setup message for the group call may be provided by the client node 300a in response to the client node 300a having obtained the broadcast service announcement. However, the client node 300a does not have to receive the broadcast service announcement before providing the call setup message. If there is no MBMS bearer the control node 200 will, upon reception of the call setup message, decide to use unicast.

Embodiments relating to further details of MBMS bearer setup as performed by the client node 300a will now be disclosed.

Reference is now made to FIG. 8 illustrating methods for MBMS bearer setup as performed by the client node 300a according to further embodiments.

As disclosed above, the control node 200 in step S102 pre-establishes at least the group communication session. Therefore, according to an embodiment the client node 300a is configured to, in a step S201, obtain pre-establishing information of at least the group communication session from the control node 200. As disclosed above, the pre-establishing in step S101 may occur prior to the step S102 of announcing the MBMS bearer. Hence, the pre-establishing information may by the client node 300a be obtained prior to obtaining the broadcast service announcement of the MBMS bearer from the control node 200. However, as also disclosed above, the order of steps S101 and S102 may be reversed and hence also the order of steps S201 and S202 may be reversed.

As disclosed above, the control node 200 in step S104 broadcasts a connect message for the group call on the MBMS bearer to at least one other client node 300b of the client nodes 300a, 300b in response to having received the call setup message in step S103. In turn, the call setup message was provided by the first client node 300a in step S203. The client node 300a is, according to an embodiment, then further configured to, in a step S205, provide a floor request message for the group call to the control node 200 after having provided the call setup message in step S203.

Figure 9:
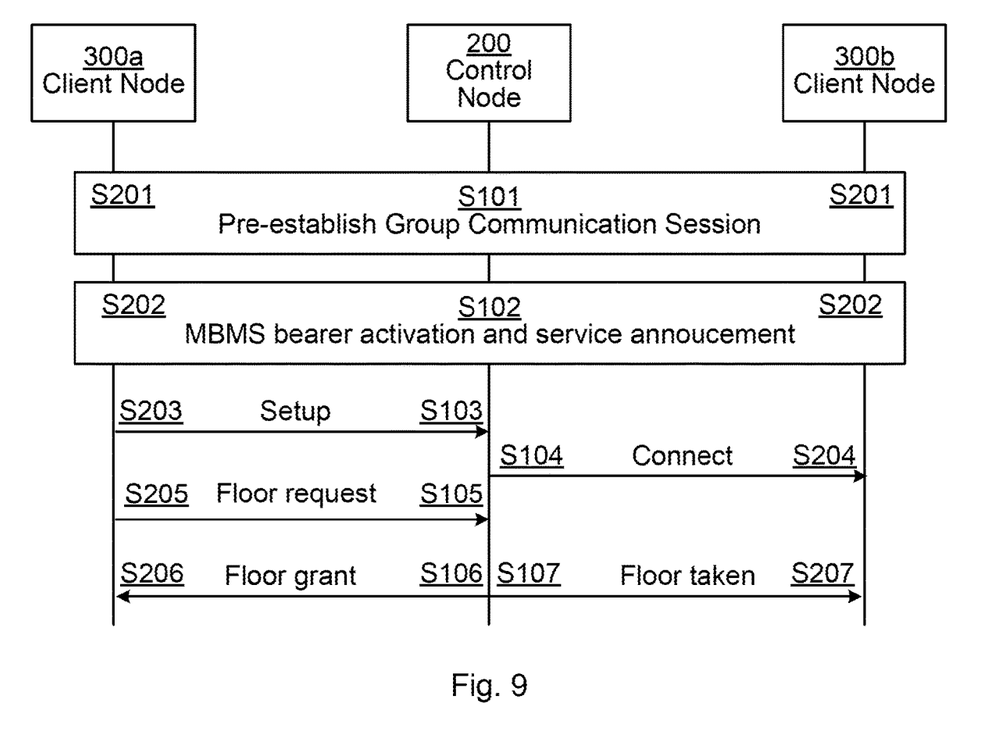
FIG. 9 is a signalling diagram according to an embodiment.

One particular embodiment for MBMS bearer setup based on at least some of the above disclosed embodiments will now be disclosed in detail with reference to the signalling diagram of FIG. 9. Parallel references are continued to FIGS. 1-8.

This particular embodiment is concerns a group communication system (such as a PTT system) that comprises a group communications server, as represented by the herein disclosed control node 200, which includes a floor arbitrator function, and a cellular network supporting both unicast and broadcast based transmission and client nodes 300a, 300b which may be installed on wireless devices 150a, 150b.

Step S101, S201: Before group communications can commence the control node 200 and the client nodes 300a, 300b pre-establish at least one group communications session and by that handshake media description parameters for the type of communication that shall be performed. This may include IP address, ports, media codecs and encryption keys. Furthermore each group communication session may include one or more media streams. One or more media streams in one or more group communications sessions that can be used by any group with the same media description parameters are thereby established.

Step S102, S202: At least one MBMS bearer is activated and announced without any particular group of client nodes being indicated. The service announcement thereby informs the client nodes 300a, 300b that there is one or more MBMS bearer active on certain resources.

Step S103, S203: The first client node 300a sends a call setup message (over a unicast bearer) to inform the control node 200 that it requests one of the pre-established sessions for media transmission. This alleviates the need for the client node 300a and the control node 200 to renegotiate the media description parameters. One purpose of the call setup message is to setup a group call using one of the pre-established sessions.

Step S104, S204: The control node 200 knows the location of the at least one second client node 300b (i.e., the receiving client nodes) in the specific group and if at least some of the at least one second client node 300b are located in the same area, the control node 200 may decide to use MBMS as a mode of transmission. To achieve that, the control node 200 sends a connect message over the broadcast channel in the area of the at least one second client node 300b that a group call will start for a specific group on activated MBMS resources and media description parameters for a specific media stream. The call connect message may be sent over a previously activated MBMS bearer to all client nodes 300b that will receive messages of the group call over this MBMS bearer. The call connect message may include group identity and an identifier of the media stream in the pre-established session that is used for the group call.

Step S105, S205: A group call commences by the first client node 300a sending a floor request message to the control node 200. This message may be sent over a unicast bearer.

Step S106, S206: The control node 200 responds to the floor request message with a floor grant message to the first client node 300a, thereby granting the first client node 300a of transmission for the specific group. This message may be sent over a unicast bearer.

Step S107, S207: The control node 200 sends a floor taken message to the at least one second client node 300b to inform the at least one second client node 300b that the floor is taken and that media transmission may start from another client node 300a. This message may include the identity of the transmitting client node 300a as well as the group identity. The message may be sent over a MBMS bearer to all client devices 300b that have previously been setup to receive calls over the MBMS bearer.

Steps S106, S206, on the one hand and S107, S207 on the other hand may be performed in the reversed order, i.e., steps S107, S207 may be performed before steps S106, S206 are performed for the same group communications session.

Comparison is now made to the process for utilizing MBMS bearers for group communications over a cellular communications system according to prior art as illustrated in FIG. 10 (and as described above). According to prior art the MBMS bearer is activated and announced prior the call setup. According to prior art the client nodes 300a, 300b already knows which resources of the MBMS bearer is assigned to the floor request for a specific group.

Some differences between the herein disclosed mechanisms and the prior art are that there are no call setup message and no connect message sent according to the prior art when using MBMS bearer. Furthermore, the service announcement in prior art allocates the MBMS resources to a specific group. In the herein disclosed mechanisms the MBMS resources can be dynamically allocated to any group.

The proposed solutions have mainly been described above with reference to a few embodiments. However, as is readily appreciated by a person skilled in the art, other embodiments than the ones disclosed above are equally possible within the scope of the disclosure, as shown by the appended list of enumerated embodiments.

The invention claimed is:

1. A method for multimedia broadcast multicast service, MBMS, bearer setup in a group communications system, the method being performed by a control node, comprising:
    activating and announcing an MBMS bearer to the client nodes, wherein the MBMS bearer is independent of any particular group of client nodes; and
    obtaining a call setup message for a group call from a first client node of the client nodes; and
    broadcasting over the previously activated and announced MBMS bearer a connect message for the group call to at least one other client node of the client nodes in response to having received the call setup message wherein the connect message informs which network resources on the bearer will be used for transmission of media for a specific group of client nodes and further comprises an identifier associated with the group call.

2. The method according to claim 1, wherein the announcing comprises parameters of media streams to be transmitted on the MBMS bearer.

3. The method according to claim 1, wherein the call setup message comprises a group identifier of a specific group of client nodes for the group call to be used for transmission of media.

4. The method according to claim 1, further comprising:
    obtaining a floor request message for the group call from the first client node after having obtained the call setup message.

5. The method according to claim 4, wherein the floor request message is obtained after having broadcasted the connect message for the group call.

6. The method according to claim 5, wherein the floor request message and the call setup message are combined into one message.

7. The method according to claim 1, further comprising:
    pre-establishing at least the group communication session prior to activating and broadcasting the MBMS bearer.

8. The method according to claim 7, wherein the pre-establishing comprises exchanging media description parameters and communications parameters with the client nodes.

9. A method for multimedia broadcast multicast service, MBMS, bearer setup in a group communications system, the method being performed by a client node, comprising:
    obtaining a service announcement of an MBMS bearer from a control node, the MBMS bearer being independent of any particular group of client nodes;

providing a call setup message for a group call to the control node in response thereto; and obtaining via the previously announced MBMS bearer a connect message for the group call, the connect message informs which network resources on the MBMS bearer will be used for transmission of media and further comprises an identifier associated with the group call.

10. The method according to claim 9, wherein the service announcement comprises parameters of media streams to be transmitted on the MBMS bearer.

11. The method according to claim 9, wherein the connect message comprises a group identifier of a specific group of client nodes for the group call and requests a specific media stream on one of the one or more MBMS bearers to be used for transmission of media.

12. The method according to claim 9, further comprising:
providing a floor request message for the group call to the control node after having provided the call setup message.

13. The method according to claim 9, further comprising:
obtaining pre-establishing information of at least the group communication session from the control node prior to obtaining the broadcast service announcement of the MBMS bearer from the control node.

14. The method according to claim 9, wherein the control node handles floor control in the group communications system.

15. The method according to claim 9, wherein the group communications system is a push to talk, PTT, system.

16. A control node for multimedia broadcast multicast service, MBMS, bearer setup in a group communications system, the control node comprising:
processing circuitry, the processing circuitry being configured to cause the control node to perform a set of operations causing the control node to:
activate and announce an MBMS bearer to the client nodes, wherein the MBMS bearer is independent of any particular group of client nodes; and
obtain a call setup message for a group call from a first client node of the client nodes; and
a communications interface configured to broadcast a connect message over the previously activated and announced MBMS bearer for the group call to at least one other client node of the client nodes in response to having received the call setup message wherein the connect message informs which network resources on the bearer will be used for transmission of media for a specific group of client nodes and further comprises an identifier associated with the group call.

17. The control node according to claim 16, further comprising a storage medium storing a set of operations, and wherein the processing circuitry is configured to retrieve said set of operations from the storage medium to cause the control node to perform said set of operations.

18. A client node for multimedia broadcast multicast service, MBMS, bearer setup in a group communications system, the client node comprising:
processing circuitry, the processing circuitry being configured to cause the client node to perform a set of operations causing the client node to:
obtain a broadcast service announcement of an MBMS bearer from a control node, the MBMS bearer being independent of any particular group of client nodes;
provide a call setup message for a group call to the control node; and
a communication interface configured to obtain via the previously announced MBMS bearer a connect message for the group call, the connect message informs which network resources on the MBMS bearer will be used for transmission of media and further comprises an identifier associated with the group call.

19. The client node according to claim 18, further comprising a storage medium storing a set of operations, and wherein the processing circuitry is configured to retrieve said set of operations from the storage medium to cause the client node (300a) to perform said set of operations.

* * * * *

UNITED STATES PATENT AND TRADEMARK OFFICE
CERTIFICATE OF CORRECTION

PATENT NO. : 10,893,393 B2
APPLICATION NO. : 15/082449
DATED : January 12, 2021
INVENTOR(S) : Åkesson et al.

Page 1 of 1

It is certified that error appears in the above-identified patent and that said Letters Patent is hereby corrected as shown below:

In the Claims

In Column 14, Line 38, in Claim 19, delete "client node (300a)" and insert -- client node --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*